United States Patent
Lenzen et al.

(10) Patent No.: US 11,315,075 B2
(45) Date of Patent: Apr. 26, 2022

(54) COMPUTER STORAGE SYSTEM

(71) Applicant: Target Brands, Inc., Minneapolis, MN (US)

(72) Inventors: Craig Lenzen, Minneapolis, MN (US); Krishna Vasireddy, Minneapolis, MN (US); Andrew Rudge, Minneapolis, MN (US); Shaun Jurgemeyer, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 42 days.

(21) Appl. No.: 16/726,475

(22) Filed: Dec. 24, 2019

(65) Prior Publication Data

US 2020/0210944 A1 Jul. 2, 2020

Related U.S. Application Data

(60) Provisional application No. 62/785,623, filed on Dec. 27, 2018.

(51) Int. Cl.
  *G06Q 10/08* (2012.01)
  *G06F 16/22* (2019.01)
(52) U.S. Cl.
  CPC .......... *G06Q 10/087* (2013.01); *G06F 16/22* (2019.01)
(58) Field of Classification Search
  CPC ................ G06Q 10/087; G06F 16/22
  USPC ......................................... 705/28
  See application file for complete search history.

(56) References Cited

U.S. PATENT DOCUMENTS

| 5,936,860 | A | 8/1999 | Arnold et al. | |
|---|---|---|---|---|
| 9,015,198 | B2 * | 4/2015 | Osmond | G06F 3/0689 |
| | | | | 707/788 |
| 9,633,237 | B2 * | 4/2017 | Heine | G06Q 10/087 |
| 10,146,466 | B1 * | 12/2018 | Puhov | G06F 3/064 |
| 2009/0228474 | A1 * | 9/2009 | Chiu | G06F 16/9024 |
| 2009/0299792 | A1 | 12/2009 | Baur et al. | |
| 2010/0257115 | A1 | 10/2010 | Robinson et al. | |
| 2018/0121869 | A1 * | 5/2018 | Bradley | G16H 40/20 |
| 2018/0157702 | A1 * | 6/2018 | Clemens | G06F 16/83 |
| 2019/0156086 | A1 * | 5/2019 | Plummer | G06T 7/248 |

OTHER PUBLICATIONS cloudblogs.microsoft.com [online] "How to build a multi-level container structure using Containerization process," Jul. 27, 2014, [retrieved on Apr. 6, 2018], retrieved from: URL <https://cloudblogs.microsoft.com/dynamics365/no-audience/2014/07/27/how-to-build-a-multi-level-container-structure-using-containerization-process/>, 13 pages.

(Continued)

*Primary Examiner* — Luna Champagne
(74) *Attorney, Agent, or Firm* — Fish & Richardson P.C.

(57) ABSTRACT

For an enterprise system, a data system has data records identifying logical items and logical containers that correspond to physical items and physical containers, the data records reflecting the storage of physical items and physical containers with other physical containers. An indication is received that a particular physical item has been moved from a first physical container to as second physical container. At least one identified data record is identified that reflects the storage of the physical item in the first physical container. The identified data records are updated to reflect the storage of the physical item in the second physical container.

18 Claims, 11 Drawing Sheets

(56) References Cited

OTHER PUBLICATIONS cloudblogs.microsoft.com [online] "Introduction to Containerization—Automated packing process in Microsoft Dynamics AX 2012 R3," Jul. 26, 2014, [retrieved on Apr. 6, 2018], retrieved from: URL <https://cloudblogs.microsoft.com/dynamics365/no-audience/2014/07/26/introduction-to-containerization-automated-packing-process-in-microsoft-dynamics-ax-2012-r3/>, 25 pages.

docs.oracle.com [online] "Oracle Warehouse Management Implementation Guide: Cartonization," 2010, [retrieved on Mar. 8, 2018], retrieved from: URL <https://docs.oracle.com/cd/E18727_01/doc.121/e13434/T210618T210726.htm>, 24 pages.

softwareengineering.stackexchange.com [online] "Inventory / Stock in multiple locations," Sep. 2014, [retrieved on Mar. 8, 2018], retrieved from: URL <https://softwareengineering.stackexchange.com/questions/211413/inventory-stock-in-multiple-locations>, 2 pages.

\* cited by examiner

COMPUTER STORAGE SYSTEM

CROSS REFERENCE TO RELATED APPLICATIONS

This application claims the benefit of U.S. Provisional Application Ser. No. 62/785,623, filed Dec. 27, 2018. The disclosure of the prior application is considered part of (and is incorporated by reference in) the disclosure of this application.

TECHNICAL FIELD

This document generally relates to architecture of computer systems.

BACKGROUND

Computers are devices that accept data input, process the data, and provide data output using hardware and software.

Warehouse management systems (WMS) have been developed and used to manage warehouses and supply chains, including managing the movement of inventory.

WMS have traditionally been tightly coupled to the physical environment within the warehouse and the physical resources available to the warehouse, such as equipment (e.g., forklifts), workers, layouts, etc.

SUMMARY

This document generally describes WMS that are decoupled from the physical environment within a warehouse, the physical inventory, and the physical warehouse resources (e.g., workers, trucks), permitting it to more efficiently and effectively perform warehouse management operations within a warehouse. For example, warehouses and their entire inventory can be abstracted out to being represented as containers and items, where each container can include one or more other containers, or one or more items. As a result, the physical layout of a warehouse and all of its contents can be represented by nested relationships of containers and items that provide enough information to effectively manage the warehouse, yet are decoupled from the specific physical environment within the warehouse.

In one aspect, a method is used for operating components of a warehouse management system. The method includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The method further includes receiving an indication that a particular physical item has been moved from a first physical container to as second physical container. The method further includes responsive to receiving the indication that a particular physical item has been moved, identifying at least one identified data record that reflects the storage of the physical item in the first physical container. The method further includes updating, responsive to identifying at least one data records, the identified data records to reflect the storage of the physical item in the second physical container.

Implementations can include any, all, or none of the following features. Each record corresponds to a logical item or a single logical container, and wherein data fields in the records store data that defines relationships that match physical-space relationships between the physical containers and the physical items. The data fields contain references to data fields of containing logical containers. The data fields contain references to data fields of contained logical containers and contained logical items. At least one data field contains a plurality of references. The updating includes editing references of the data records without moving the data records to a different memory location. Editing references includes removing a particular string of characters from one data field and adding the particular string to another data field as an atomic action. Editing references includes removing a particular string of characters from one data field; and responsive to removing the particular string of characters from the one data field, adding the particular string to another data field.

In one aspect, a system includes a processor. The system further includes computer memory containing instructions that, when executed with the processor, cause the system to perform operations includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The operations further include receiving an indication that a particular physical item has been moved from a first physical container to as second physical container. The operations further include responsive to receiving the indication that a particular physical item has been moved, identifying at least one identified data record that reflects the storage of the physical item in the first physical container. The operations further include updating, responsive to identifying at least one data records, the identified data records to reflect the storage of the physical item in the second physical container.

Implementations can include any, all, or none of the following features. Each record corresponds to a logical item or a single logical container, and wherein data fields in the records store data that defines relationships that match physical-space relationships between the physical containers and the physical items. The data fields contain references to data fields of containing logical containers. The data fields contain references to data fields of contained logical containers and contained logical items. At least one data field contains a plurality of references. The updating includes editing references of the data records without moving the data records to a different memory location. Editing references includes removing a particular string of characters from one data field and adding the particular string to another data field as an atomic action. Editing references includes removing a particular string of characters from one data field; and responsive to removing the particular string of characters from the one data field, adding the particular string to another data field.

In one aspect, a non-transitory computer-readable medium containing instructions that, when executed with a processor, cause the performance of operations includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The operations further include receiving an indication that a particular physical item has been moved from a first physical container to as second physical container. The operations further include responsive to receiving the indication that a particular physical item has been moved, identifying at least one identified data record that reflects the storage of the physical item in the first physical container. The operations further include updating, responsive to identifying at least one data records, the identified data records to reflect the storage of the physical item in the second physical container.

Implementations can include any, all, or none of the following features. Each record corresponds to a logical item or a single logical container, and wherein data fields in the records store data that defines relationships that match physical-space relationships between the physical containers and the physical items. The data fields contain references to data fields of containing logical containers. The data fields contain references to data fields of contained logical containers and contained logical items.

The systems, devices, program products, and processes described throughout this document can, in some instances, provide one or more of the following advantages. By decoupling elements of a WMS, those elements can be advantageously and more easily designed and upgraded. As such, the technology of computer systems is advanced. Indirect communication where one element of the system is not blocked while waiting for a response from another element allows for less complex design and greater robustness in the face of system errors, network slowdowns, etc. By using a logical location for items and containers tracked by a WMS, a single unified data model can be used for physical locations and objects with very different properties.

DESCRIPTION OF DRAWINGS

Like reference symbols in the various drawings indicate like elements

DETAILED DESCRIPTION

This document describes a warehouse management system (WMS) that includes (a) an inventory management system, (b) a workload management system, and (c) a task management system that are each logically and procedurally independent of each other. Each component may retain and modify data for its own use and may publish that data to other components for consumption but no component modifies the internal data of another component nor is synchronously dependent upon the data modification. Such independence among these components can provide a variety of advantages, including the ability to readily scale each of the components independent of each other, to swap in/out different iterations and versions of each component, and other design/management independence among the components.

For example, these components can operate in a service-oriented architecture that allows for greater flexibility in upgrading and changing the system as time goes forward. Because each unit is self-contained and only communicates through established interfaces, they may be replaced by a new unit without notification or modification of other units. This allows the system to more easily grow as business needs change.

Figure 1:
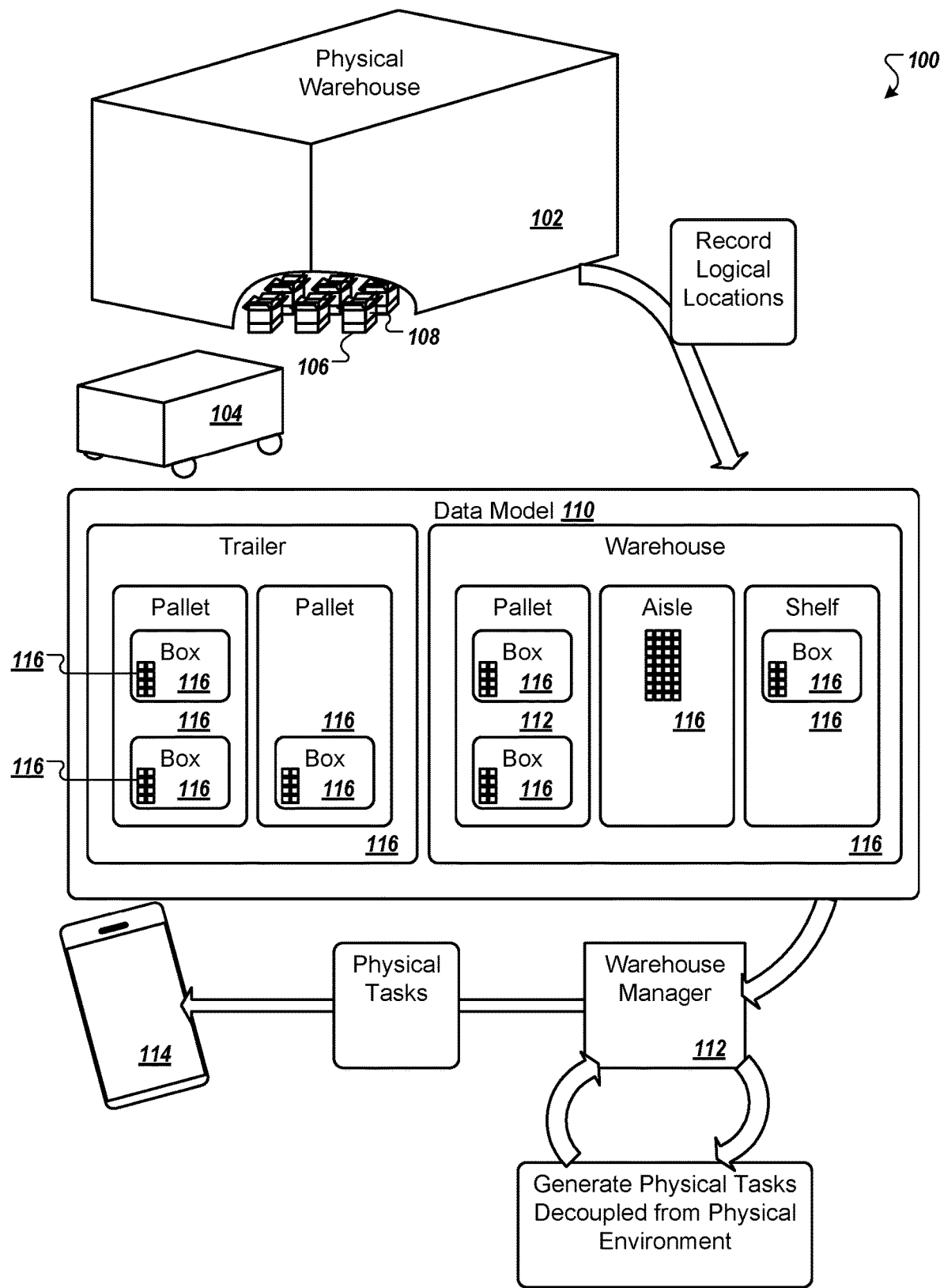
FIG. 1 is a diagram of an example system used in the management of warehouses.

FIG. 1 is a diagram of an example system 100 used in the management of warehouses. In the system 100, data about the status of items in a retail supply chain are tracked and tasks are generated in order to support the function of the retail system. However, a system like the system 100 can be used for any purpose that includes tracking and moving or supplying items at times and places where needed including the distribution of humanitarian aid, military equipment, manufacturing parts, etc.

A physical warehouse 102 and a trailer 104 are two example physical containers used to physically house items that are moved through a supply chain. The warehouse 102 is a stationary permanent building where items are received, stored, and shipped from. The trailer 104 is a mobile structure that can be attached to a truck and transported over roadways. Other example physical containers include shipping containers, train cars, oceanic ships, box trucks, etc.

Other types of physical container include a pallet 106 and a box 108. A pallet 106 is a structure often made of wood or plastic onto which boxes 108 can be stacked and moved with a pallet jack, forklift, etc. Other example physical containers can include bins, bags, dollies, aisles, shelfs, forklifts, pallet jacks, etc.

As can be seen, a physical container can take a wide variety of shapes and sizes. Physical containers can store items and, in some but not all cases, other containers. For example, a toothbrush (an item) can be bundled in a bag (a container) with other toothbrushes (other items). The bag can be stored in the box 108 (a container) on the pallet 106 (a container) in the warehouse 102 (a container) or in the trailer 104 (a container.)

As with any physical object, the physical containers and items can be recognized as having many types of physical properties. Such physical properties include color, weight, size, etc. Physical objects can have recognized physical locations such as latitude and longitude coordinates, an X, Y, and Z location within a building, etc. However, the physical attribution of containers is separated logically from the container tree that models the logical relationships between containers. For example, the toothbrush mentioned above may have a logical location of within bag #2 within box #6 within (or on) pallet #3 within warehouse #2 and that relationship is external to the specific coordinates of any given container.

In order to represent these logical locations, a data model 110 can be recorded. The data model 110 can include data collected and stored on computer systems that allow software to understand logical locations of containers and items within a supply chain. In this example, the data model includes records 116 for physical containers and for items within containers. As shown here, the trailer 104 has a corresponding record in the data model 110. Pallets and boxes within the trailer have corresponding records 116 for items within the boxes. Similarly, there are records 116 for the warehouse 102, the pallets 106, and the boxes 108 and for aisles, shelfs, and items within the warehouse 102.

A warehouse manager 112 can use the data model 110 to generate physical tasks using instructions that are decoupled from the physical environment. For example, the warehouse manager 112 can reference containers and items using the relative location of records 112. These physical tasks can include instructions to pick, move, and place items or containers. For example, a physical task may include instructions to pick the bag of toothbrushes out of the box in which they are located, to remove the toothbrushes from the bag, and to place the toothbrushes into various shipping envelopes. In another example, a physical task may instruct a user to use a pallet jack to remove a pallet from the trailer 104 and move the pallet to the physical warehouse 102.

When a physical task is generated, the physical task may reference the items and containers by their logical location. That is, the physical task may be reference the toothbrushes as being in the warehouse, in a particular row, in a particular pallet, in a particular box etc. The physical task may include instructions to take particular actions such as pick (pick an item or container up), place (placing the picked item in another logical location), etc.

The physical tasks can be transmitted to devices 114 for completion. For example, tasks assigned to human recipients can be sent to mobile computing devices such as cell phones or tablets for display to the human recipients. The tasks can then be formatted in a human-readable display that shows the human recipient what actions are being requested and for which items or containers. In particular, the display can reference the items using their logical locations. In some implementations, the physical tasks can be transmitted to computer-controlled equipment. For example, an automated conveyor belt or pallet-moving robot can be instructed to move a container or item from one logical location to another logical location.

Figure 2:
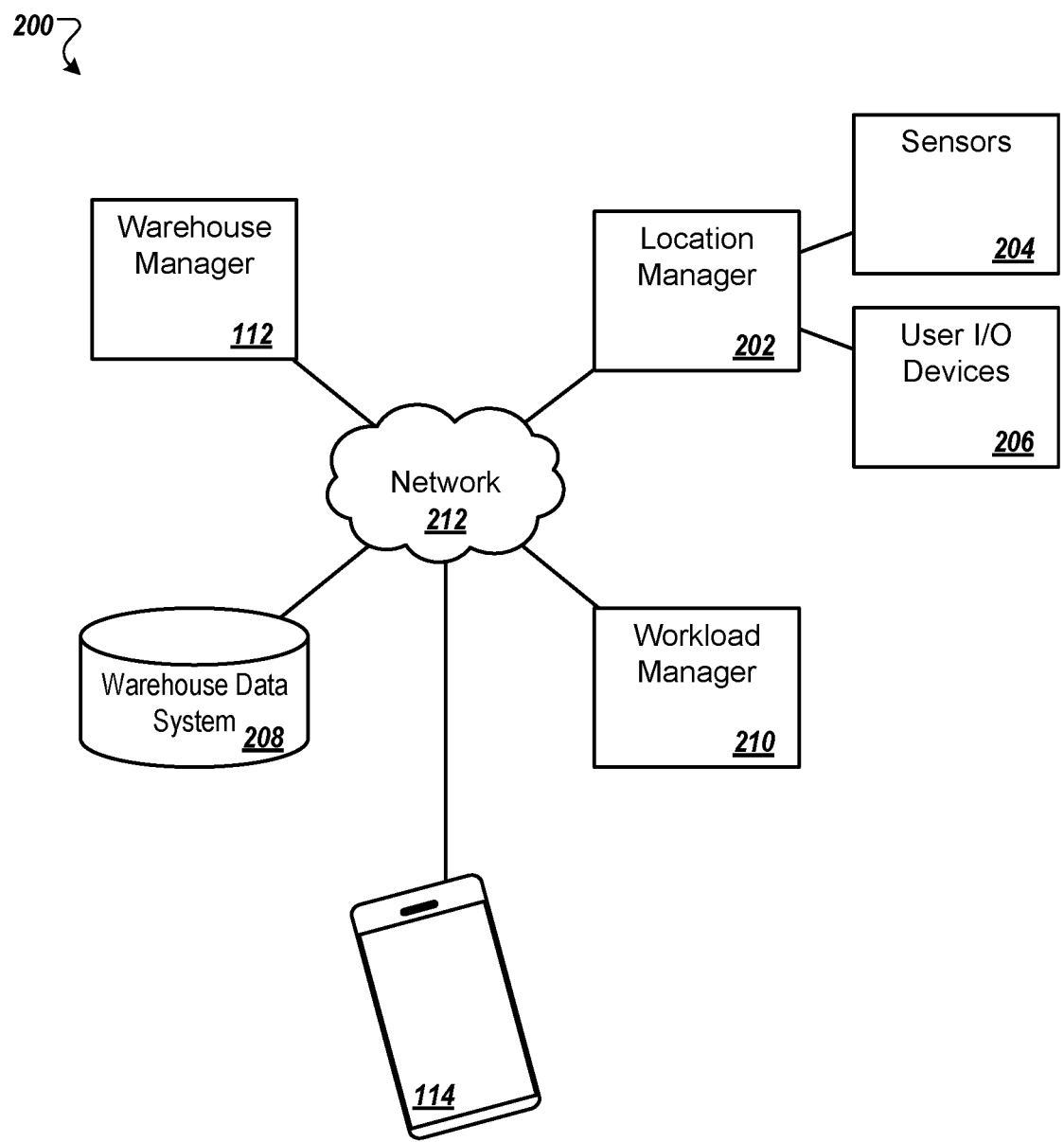
FIG. 2 is a diagram of an example system for managing data in a warehouse system.

FIG. 2 is a diagram of an example system 200 for managing data in a warehouse system. The system 200 can be used with the WMS as described above.

An inventory manager 202 is a computer or computer system or computer that receives signals from multiple sources in order to execute the creation, updating, or deletion of inventory and containers. Input signals could come from various devices including human operated scanners, unmanned sensors like RFID readers, video cameras, barcode scanners, or other system components. Each signal will include identifying data about the physical location, item or container, and/or information about the nature of the activity. The inventory manager 202 can receive these signals and apply logic to translate the signals to updates to the logical inventory container tree. Updates could include the creation of an item or container, the movement of an item or container to another container, a disposition change of an item or container, or the deletion of an item or container.

User I/O devices 206 can be used by the inventory manager 202 to provide output and receive input from users. For example, the user I/O devices 206 can include computers, monitors, keyboards, speakers, computer-mice, tablets and mobile computing devices in data communication with the inventory manager 202. The inventory manager 202 can provide data to a user I/O device 206 (e.g., a GUI) prompting a user to provide input (e.g., entering an item identifier or number of items).

A workload manager 210 can generate work orders using the data model that is stored in the warehouse data system 208. For example, the workload manager 210 may receive a notification that the toothbrushes described above are needed at a different location. In response, the workload manager can access the warehouse data system 208 to determine the logical location of the toothbrushes and to access a logical destination to which the toothbrushes should be moved. The workload manager 210 can generate a series of work orders to be executed (picking the toothbrushes, placing them into a shipping container, placing the shipping container on a trailer, etc.) The work orders can be stored in the warehouse data system 208 and then pushed to user devices 114 of users assigned to the work orders.

Communication for the system 200 can be made through a network 212. The network 212 can include one or more data networks through which elements can pass data messages. The network 212 can be, or can include, the Internet.

As has been described, the warehouse manager 112 and the workload manager 210 are established discretely so that neither element needs to wait on the other. That is, communicating between the two elements takes place asynchronously through the publishing of events to a computer-storage media that can be read within the warehouse data system 208. With the warehouse manager 112 and the workload manager 210 configured to operate without direct communication channels being created or maintained and/or without synchronous communications (that is to say, without waiting for a response or confirmation), the warehouse manager 112 and the workload manager 210 can operate in a way that implicitly assumes the other will operate correctly. This type of configuration provides a number of advantages that overcome possible problems related to computer technology. As will be understood, the warehouse data system 208 can include buffers for other elements of the system 200, may include one or more separate databases, etc.

For example, if the warehouse manager 112 or the workload manager 210 experiences a technical problem and goes off-line for a time, the other element can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional warehouse manager 112 or workload manager 210 instances can be added to the system 200 to handle greater load without needing to notify the other elements.

Figure 3A:
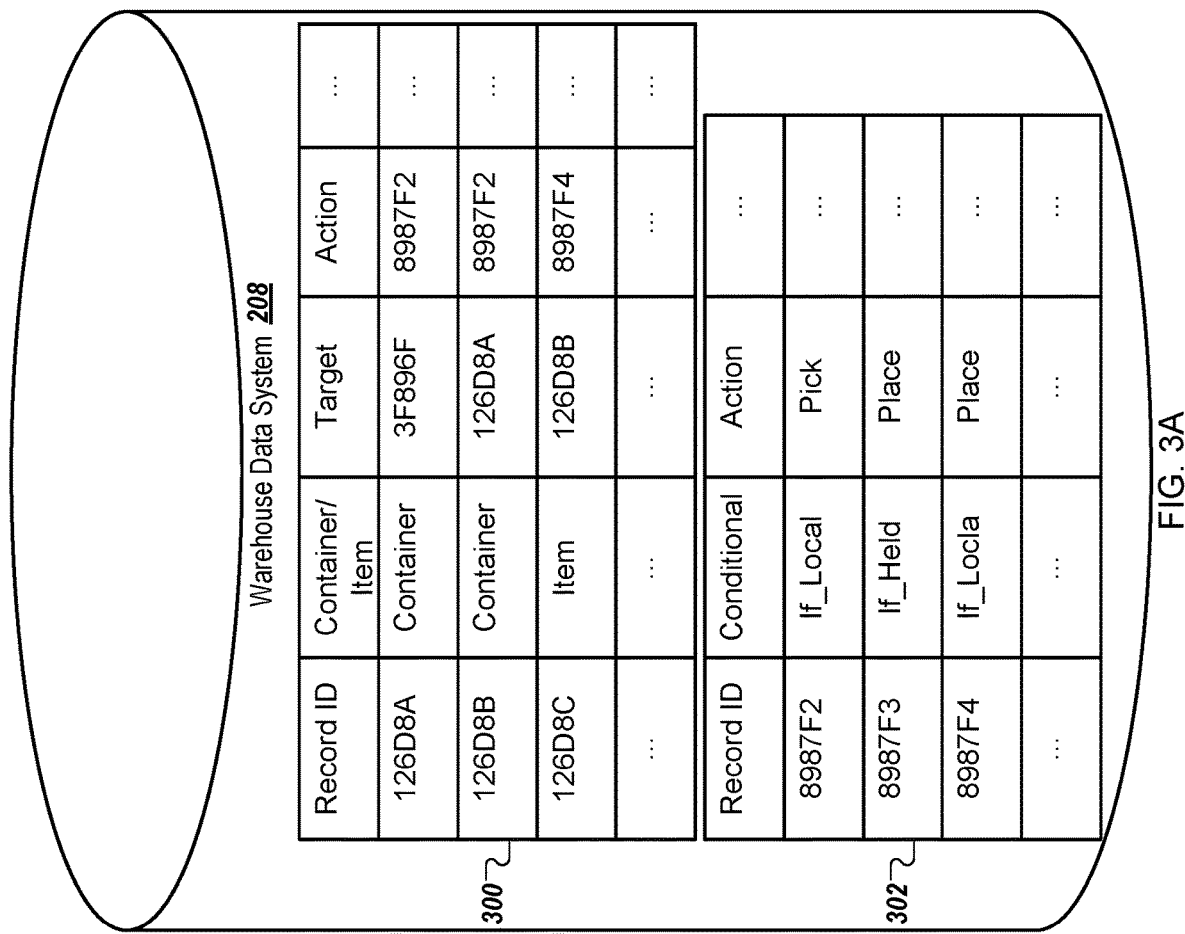
FIGS. 3A and 3B are diagram of an example of data used by a warehouse management system.

FIG. 3A is a diagram of an example of data used by a warehouse management system. In this example, the data described is stored within the warehouse data system 208 in the form of tables of records, with each record having multiple fields. In this example, each row is a different record and each column is a different field. Other forms of data storage can be used.

A table 300 stores data for a data model of a WMS such as the data model 110. Each record in the table 300 corresponds to an action that occurred involving a specific item or container. Each record references the unique identifier of the impacted item or container and the details of the action that occurred. Actions can include creation of an item or container, movement of an item or container to a different container, change in status of the inventory or container, or the removal of the inventory or container from the system. The action records can be aggregated to determine the current logical state of any given leaf or branch in the item container tree. This allows for historical and current item and container state to be stored concurrently. Additionally, other logical views can be created to answer specific questions of import to system functions. Examples include, "what are the containers in which this item exists," and "what items exist in this container."

As shown here, the data representing the logical location of the item comprises no data explicitly indicating the physical location of the target item. However, other formats for the data are possible, including other formats that may not be easily parsed, that are not sequential, and/or that explicitly indicating the physical location of the target item.

A table 302 stores data for tasks of the WMS such as those generated by the workload manager 210. Each record in the table 300 corresponds to as single task in the WMS. In some examples, each record can contain a tree structure of actions that defines the task. Each task tree has a "point of entry" that indicates how a user or machine would initiate the task. Once initiated, the task tree has a series of possible actions, each triggered by a specific input provided by a human user, machine, or system event. Actions can have validations and next possible actions. Collectively, the point of entry and the actions tree enable the execution of the task and variants of the task.

For example, the task with the "Record ID" of 8987F2 specifies that the task should determine if a conditional function "If_Local" returns TRUE or FALSE and, if TRUE, perform a "Pick" action If FALSE, and for operations after the Pick, further columns in the record can specify operations.

When rendered for display on a user device, this task may be displayed using information from the record "8987F2" and from the record for the item "126D8C," with sufficient detail to instruct a user to complete the task. This information may include additional information from the records such as a descriptive name (e.g., "toothbrush"), a photograph, a brand name, a color, or the fully qualified logical location of the item. For example, the task may be displayed as "Pick the ExampleBrand Toothbrush number 126D8C from the bag 126D8B in aisle 126D8A."

Figure 3B:
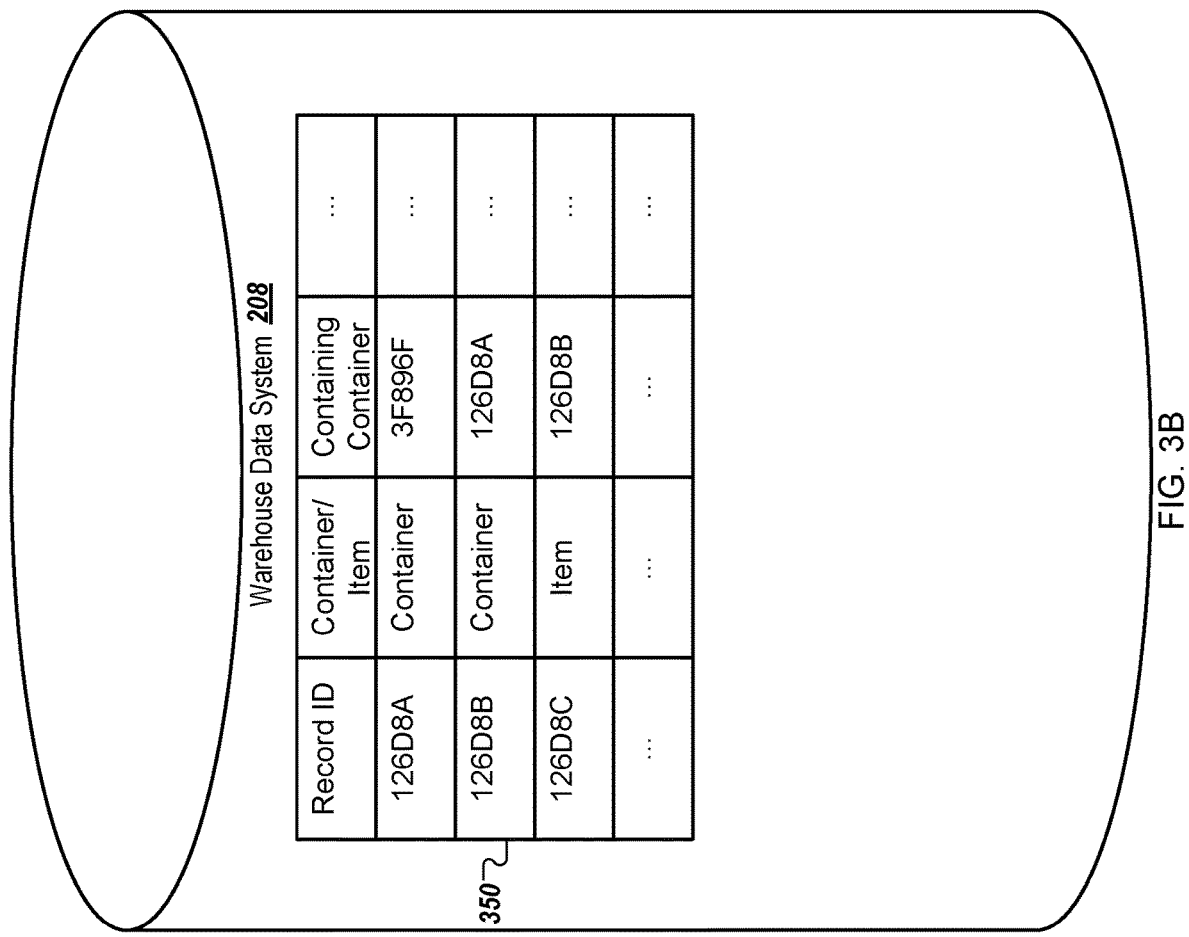

FIG. 3B is a diagram of an example of data the can be used by a warehouse management system. The data in FIG. 3B can be used in addition to or in the alternative to the data of FIG. 3A.

A table 350 stores data for a model of a WMS such as the data model 110. Each record in the table 300 corresponds to a single container or a single item in the WMS. Each record includes a data field for a "Record ID." The "Record ID" is a unique identifier that uniquely identifies the record in the table 300. That is to say, no "Record ID" is a duplicate. A data field "Container/Item" stores data that records if the associated contain or item is in fact a container or if it is instead an item. A data field "Containing Container" stores data that records the container that is currently containing the item or container that the record corresponds to. For example, if record 126D8C corresponds to one of the toothbrushes, this record lists the "Containing Container" as 126D8B. The record with the "Record ID" 126D8B corresponds to the bag containing the toothbrush.

Using the table 300, logical locations of items and containers can be identified. In some cases, the logical location can be express a sequence of identifiers that each correspond to containers that contain the item. For example, the logical location of the toothbrush may be expressed as "126D8A\126D8B\126D8C." This string uniquely and fully describes the logical location of the toothbrush in a format that can easily be parsed by a computer processor in order to gain access to the information specifying the logical location. As such, the sequence of identifiers is an ordered sequence of identifiers that represent an ordering of containers around the item.

Figure 4:
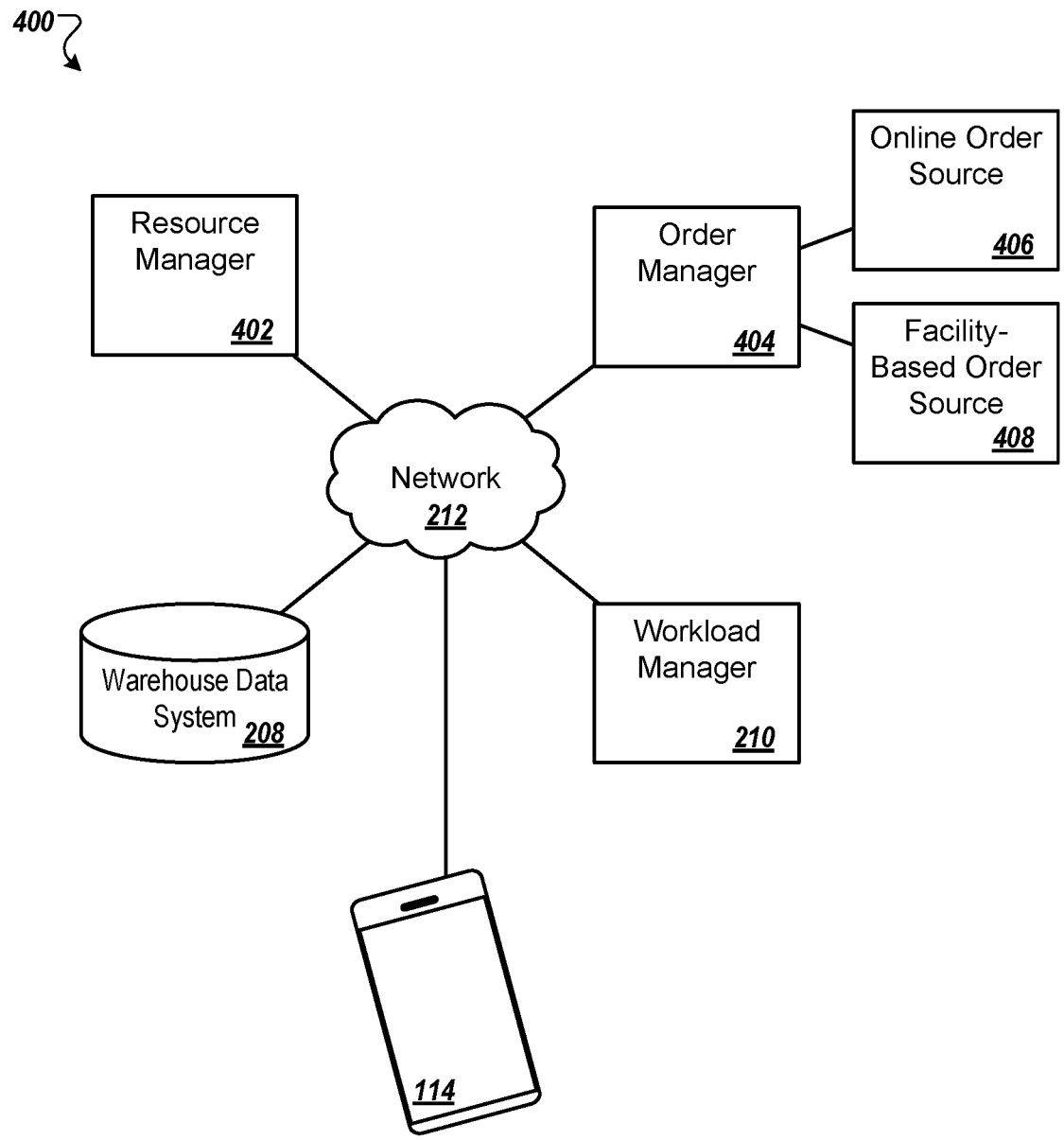
FIG. 4 is a diagram of an example system for workload management.

FIG. 4 is a diagram of an example system 400 for workload management. The system 400 can be used in conjunction with the system 200 for WMS operations, and in fact, the example shown uses some of the same components. It will be understood that implementations of a WMS can include up to all elements of the system 200 and 400 working together for WMS purposes.

The workload manager 210 is responsible for generating tasks for users and resources of the warehouse system. A resource manager 402 is responsible for managing data related to those users and resources. For example, the resource manager 402 can record, in the warehouse data system 208, data identifying employee or user names, job descriptions, scheduling, task capabilities, etc. The resource manager 402 can also or alternatively record, in the warehouse data system 208, data identifying non-human resources. For example, vehicle information, fixture information (e.g., shelving, bins, carts), and facility information (e.g., warehouse physical location, doorway status, security status, sensor data) can be managed by the resource manager 402 in the warehouse data system 208.

Order data can be managed in the warehouse data system 208 by an order manager 404. Orders can include requests from inside or outside the WMS that request some action to be accomplished. For example, an order may be a request to provide a distribution center with a number of toothbrushes by a particular day so that they can be loaded to a trailer and moved to a distribution endpoint (e.g., a retail store, a dental clinic). Another type of order is a purchase order. For example, a customer of the retail store may purchase a toothbrush online or at a retail store that is currently out-of-stock, and the order may call for the toothbrush to be moved to the retail store or shipped directly to the customer's home.

Orders can come into the order manager 404 through one or more channels. An online order source 406 can receive orders from online sources (e.g., websites, applications). For example, a customer can purchase a toothbrush from a retail application running on their mobile computing device, or the dental clinic can place an order for delivery of a supply of toothbrushes when the dental clinic's stock is low.

A facility-based order source 408 can receive orders from user input within a facility or from users associated directly with the WMS. For example, one of the users who works for the WMS (and thus has data managed by the resource manager 402) may use a user-interface in a warehouse to generate an order to move assets. For example, the toothbrushes discussed above may be received from a manufacturer at a warehouse, and the user may generate an order to disburse the toothbrushes to different warehouses across the country in preparation for future needs.

The order manager 404 may place data of orders into the warehouse data system 410, and the workload manager 210 can then access the data of the order and generate tasks from the order data. For example, in order to complete an order requiring the toothbrush to be moved to a different warehouse, the workload manager 210 can generate tasks to pick the toothbrush in the first warehouse, place the toothbrush in a box on a pallet scheduled to be placed on a trailer, pick the pallet off the trailer at the destination warehouse, and place the pallet in the destination warehouse.

As has been described, the workload manager 210, resource manager 402, and the order manager 404 can be configured so that no element needs to wait on the others.

That is, communicating between the elements may take place only indirectly through the storing and reading of data within the warehouse data system 208. With the workload manager 210, resource manager 402, and the order manager 404 configured to operate without direct communication channels being created or maintained, the workload manager 210, resource manager 402, and the order manager 404 can operate in a way that implicitly assumes the others will operate correctly. This type of configuration provides a number of advantages that overcome possible problems related to computer technology.

For example, if the workload manager 210, resource manager 402, or the order manager 404 experiences a technical problem and goes off-line for a time, the other elements can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional the workload manager 210, resource manager 402, and the order manager 404 instances can be added to the system 200 to handle greater load without needing to notify the other elements.

Figure 5:
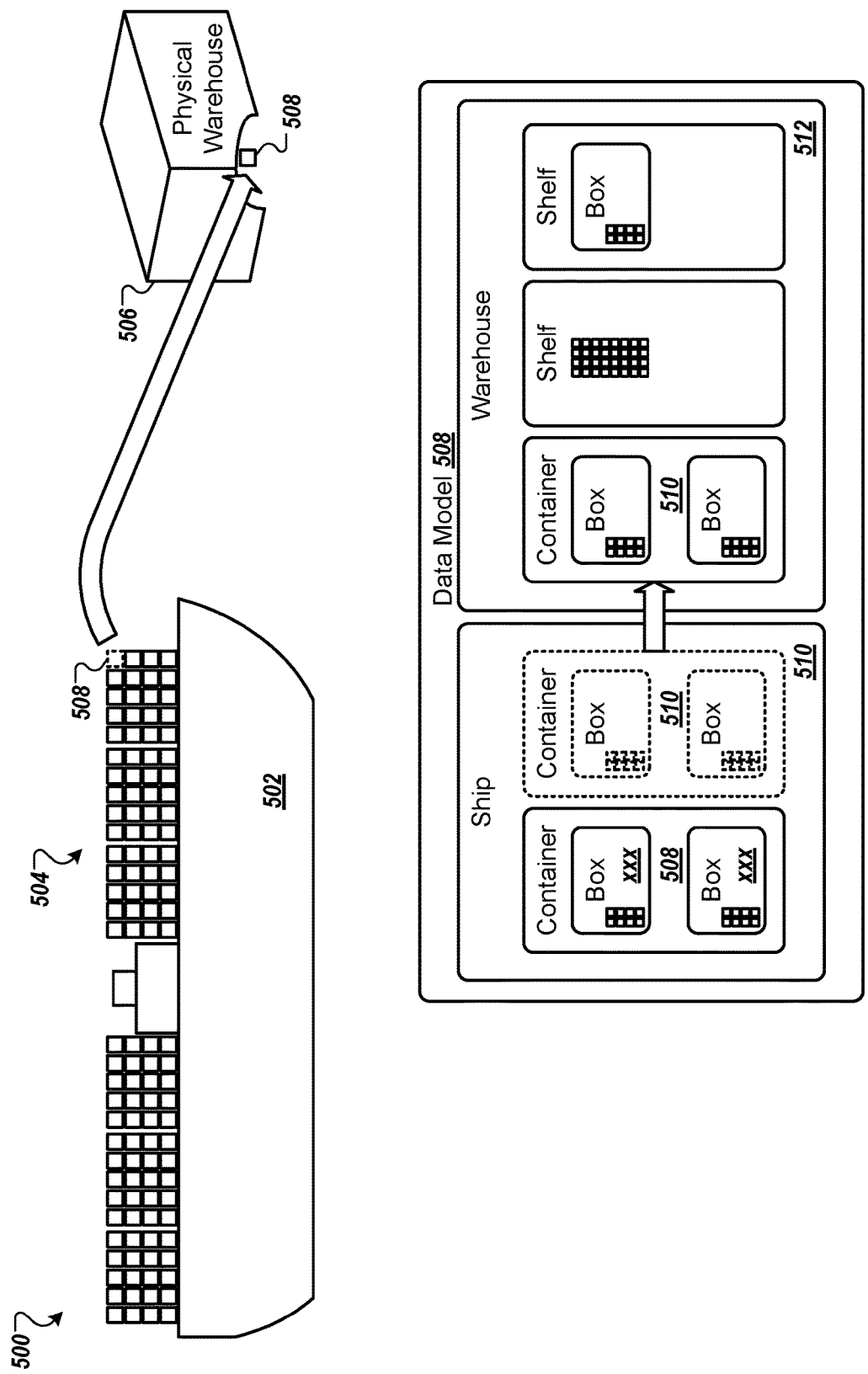
FIG. 5 is a diagram of an enterprise with data for tracking items.

FIG. 5 is a diagram of an enterprise system 500 with data for tracking items. In the enterprise system 500, a ship 502 is being used to transport shipping containers 504 at a physical warehouse 506. For example, the enterprise system may use the elements show to move items to a particular location for a variety of uses. This may include for supply to a retail location, for distribution to the public, for use in a construction project, etc.

The ship 502 is an oceangoing vessel that is capable of holding shipping containers 504 for transport from port to port. It can contain, for example on deck or in a hold, many such shipping containers 504 for transportation and storage purposes. The shipping containers can be loaded and unloaded from the ship 502 into the warehouse 506, or (not shown) onto railcars, onto trailers for highway transport, stacked out-doors for long-term storage, etc.

The shipping containers 504 may contain boxes, pallets, bins, or other contains holding items. In addition, some items may be loaded directly into the shipping containers 504 without any other containers around them.

A data model 508 can be maintained for the enterprise system 500. For example, the data model 502 can be stored in a data system like the warehouse data system 208 or another data system. The data system may be able to communicate with other computer devices directly or over data networks in order to make the data model accessible to the other computer devices.

The data model 508 can be stored with data records identifying logical items and logical containers that correspond to the physical items and physical containers of the enterprise system 500. For example, the data model 508 is shown conceptually in FIG. 5 with logical elements (i.e. logical containers and logical items) for the ship 502, containers 504 (some logical containers not shown for clarity and space reasons,) and the physical warehouse 506. Further, some physical elements like shelfs, boxes, and items not shown for clarity and space reasons have corresponding logical elements shown.

The data records further reflect the storage of physical items and physical containers with other physical containers. For example, when a physical container contains a physical element, the corresponding logical elements are shown nested within each other. As the containers 504 are contained by the ship 502, container logical elements 508 are shown nested within the ship logical element.

In the enterprise system 500, a container 508 is unloaded from the ship 502 into the warehouse 506. To reflect this action, the data model 508 is updated so that a logical contain 510 in the logical ship 510 is moved to the logical warehouse 512 within the data model.

In order to perform this update, data of the data model 508 is manipulated. The form of the manipulation depends on the format of the data records of the data model 508. For example, in some cases, each record of the data model 508 corresponds to a single logical item or a single logical container, and data fields in the records store data that defines relationships that match physical-space relationships between the physical containers and the physical items. In such cases, the data fields can be edited to reflect this change. For example, in the example tables 302 and 304, each record contains a reference to data fields of containing logical containers. However, as will be shown below, in another example, each record can contain a reference to data fields of contained logical elements.

Figure 6:
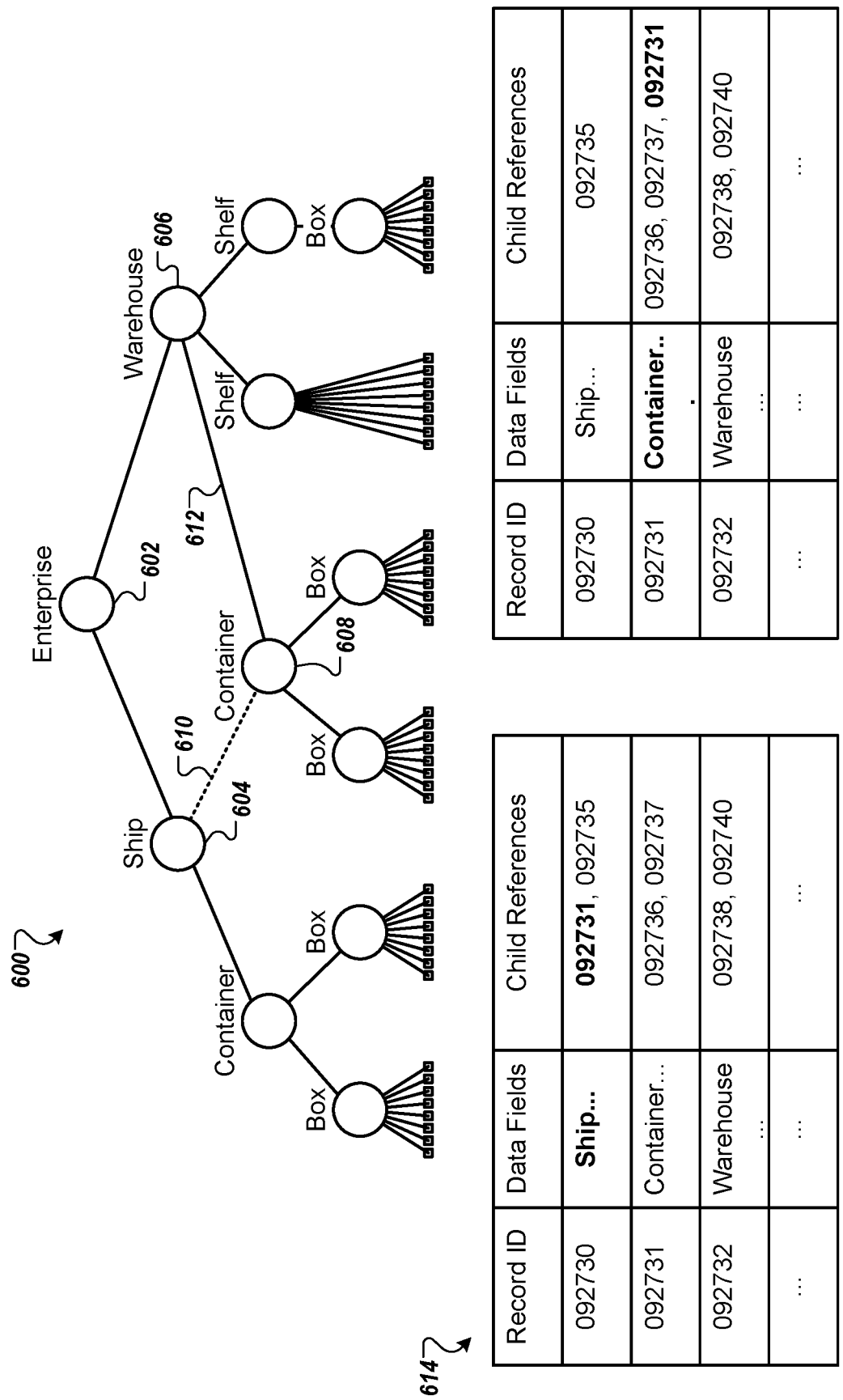
FIG. 6 is a diagram of a data structure used by the enterprise.

FIG. 6 is a diagram of a data structure 600 used by the enterprise system 500 to maintain information about the state of the enterprise system 500. The data structure 600 is a tree 600 that holds the state of the enterprise system 500 in its contents and arrangement. The root node 602 of the tree 600 corresponds to the entire enterprise of the enterprise system 500 as this is the foundational or largest entity to be tracked. In another example with a different foundational or largest entity, a different corresponding root node could be used.

Child relationships in the tree 600 represent containment relationships. For example, the enterprise contains the ship 502 and the physical warehouse 506 and 508. As such, corresponding child nodes 604 and 608 are under the root node 602. Further child nodes for containers, shelfs, boxes, and items are arranged in the tree 600.

When the container 508 is moved from the ship 502 to the warehouse 506, the relationships of the tree 600 are updated. Here, the node 608 is moved from being a child of the ship 604 to a child of the warehouse 606. Given that, in the enterprise system 500, the container 508 is not emptied and the contents are not altered, the children of the node 608 are not changed in the tree 600. Instead, only the relationship 610 is removed and a new relationship 612 is created.

Data for the tree 600 is recorded in computer memory (e.g., in a warehouse data system) as shown in data 614. In the data 614, fields for each logical container and logical item are shown in each row. The rows include one or more data fields with information about the elements such as type, color, inventory number, value, etc. The relationships of the tree 600 are stored in a field labeled "Child References." For example, the ship 604 is shown in row 092730. Initially, two references are stored as a list of two strings. Then, when the tree 600 is updated, the row 09273 is updated to remove the reference to 092731, and that reference is added to the row 092731.

Some rows record a plurality of references, some rows record one reference, and some rows record zero references. This architecture for the data 614 allows the creation of a tree 600 that is capable of reflecting many configurations of the enterprise system 500, including those in which some containers contain both items and other containers.

As shown, changes to child references can include at least two edits to the data 614. In some cases, these edits to the data 614 can be performed as atomic actions. That is, since the physical phenomena of moving an element out of one container and into another is only a single action, access and edits to the data 614 can be constrained so that multiple operations appear to be a single operation. That is, access to the data 614 by other operations may be prevented and delayed while a reference is removed from one row and added to another row.

In some cases, edits to the data 614 can be performed sequentially. That is to say, removal of child reference may, upon completion, trigger the addition of the child reference to another row afterwards. This configuration may allow for uninterrupted access by other processes to the data 614 while edits are being made.

As has been shown, updates to nodes in the tree 600 and the data 614 do are accomplished by editing data fields without the movement of a data record from one row to another. As shown here, the contents of two data fields are edited without complete removal or re-writing of a data record in memory. Such a scheme can allow for more efficient and faster data processing than would be possible if full data records need to be written to memory each time a reference changes.

Figure 7:
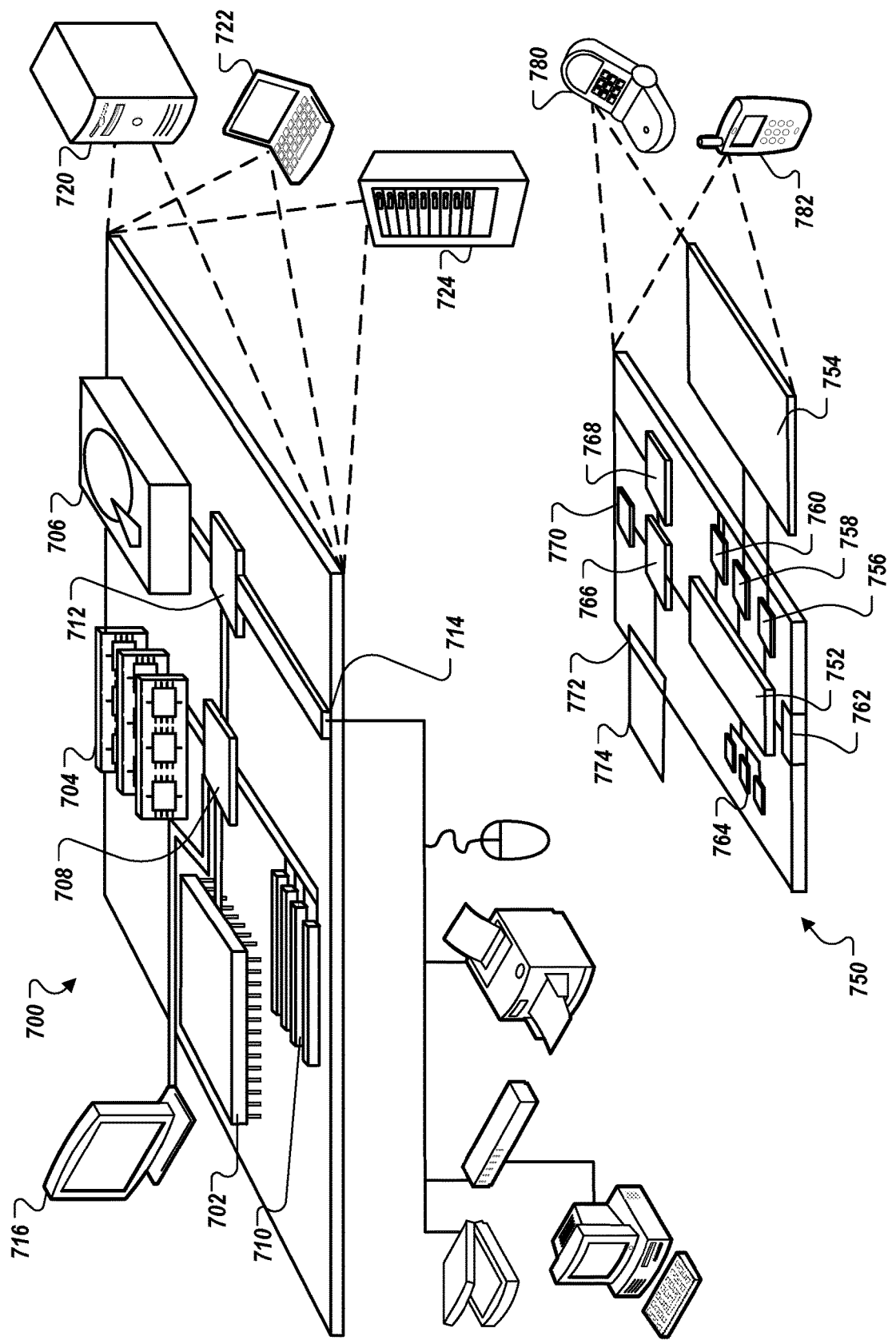
FIG. 7 is a schematic diagram that shows an example of a computing system.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described throughout this document. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described throughout this document, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described throughout this document. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 8:
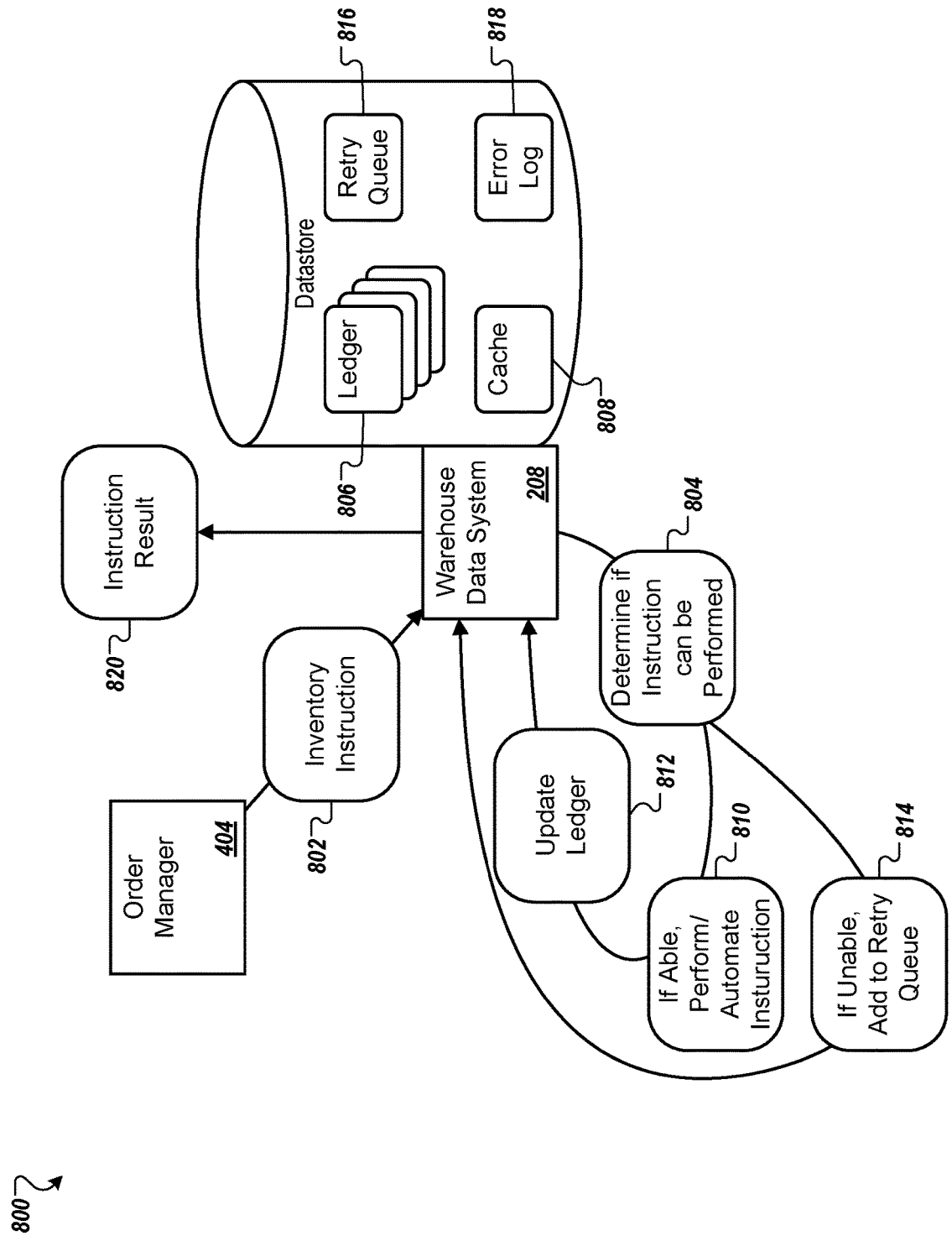
FIG. 8 is a diagram of an example system for managing inventory data.

FIG. 8 is a diagram of an example system 800 for managing inventory data. In the system 800, the order manager 404 aggregates orders from various sources and generates inventory instructions 802 for the warehouse data system 208. For example, the inventory instructions can take the form of an instruction to create an item or container (e.g., to reflect an acquisition of a corresponding physical item), an instruction to move an item or container from one container to another, or to mark an item or container as disposed of (e.g., to reflect sale or physical loss of the item). Other types of instructions are possible.

The warehouse data system 208 can determine if the instruction can be performed 804. For example, the warehouse data system 208 can maintain one or more ledgers 806 to record data. A ledger 806 for a particular item can record historical instructions for the item such that, when the instructions are interpreted in sequence, the current state (e.g., logical location) of the item or container can be determined. In order to increase efficiency of the warehouse data system 208, a cache 808 can also directly record the current logical location of a container or item.

To determine if an instruction can be performed, the state of the item or container can be compared with the instruction. If the instruction is logically possible according to one or more rules of the system 800, the instruction can be performed. For example, each instruction to move an item or container may include a "from" and "to" field that specifies the container the target is to be moved from and to. If the target item or container is not in the container specified in the instruction, this can be determined by the warehouse data system 208 as not able to be performed. If the target item or container is in the container specified in the instruction, this can be determined by the warehouse data system 208 as possible to perform.

If the instruction can be performed 804, the warehouse data system 208 can instruct 810 the performance or automation of the instruction 810. For example, instructions can be sent to a user's screen instructing them to move a target from one container to another, or computer-readable instructions for an automation device can be generated.

If the instruction can be performed 804, the warehouse data system 208 can update 812 the ledger 806 with a record of the instructions. After the update to the ledger 806, or in response to the update to the ledger 806, the warehouse data system 208 can update the cache 808 with the current state of the item or container at issue.

If the instruction cannot be performed 804 (e.g., if the instruction is not compatible with the state of the target item or container), the warehouse data system 208 can place 814 the instruction in a retry queue 816. After a period of time, instructions in the retry queue 816 can be retried one or more times. This can allow, for example, out of order instructions received by the warehouse data system 208 to be handled asynchronously and without blocking. After the one or more retry attempts, invalid instructions can be added to an error log 818. Then, the warehouse data system 208 can process an entry to the error log 818 by generating a message for another system, engaging a physical device, etc.

Alternatively, in some implementations, all of the instructions are added to the ledger 806 regardless of whether or not they are valid at the time they are added. In instances where an invalid instruction is added to the ledger 806 (e.g., an instruction that cannot be completed based on predicate conditions for the instruction not being met), the instructions can be ignored in determining an update to the cache 808 and can be added to the error log 818 for reevaluation for use in updating the cache 808 at a later time.

Upon completion of an instruction, the warehouse data system 208 can send instruction results 820. For example, the warehouse data system 208 can send the instruction results to the order manager 404, to the warehouse manager 112, to the workload manager 210, etc.

Figure 9:
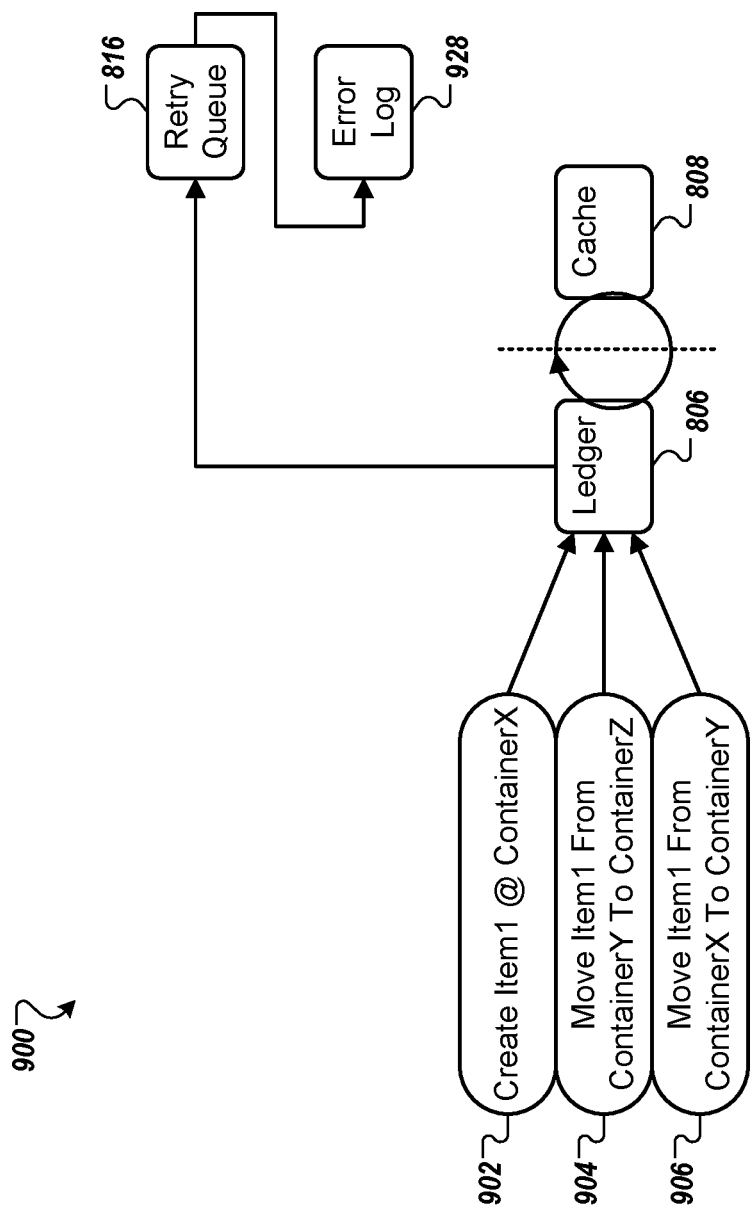
FIG. 9 is a diagram of example data recording inventory data.

FIG. 9 is a diagram of example data 900 recording inventory data. The data 900 can be stored in, for example, the warehouse data system 208. Instructions 902-906 can be assigned to be recorded in the ledger 806. These instructions 902-906 may come into the data 900 in any order, including out of order. That is, the instructions 902-906 describe an example where an item (item1) is physically acquired into a container (containerX), moved (from containerX to containerY), and moved a second time (from containerY to containerZ). This results in the generation of the instructions 902-906. However, the instructions can be received out of order. As shown here, the instruction 904, to record a logical movement (from containerY to containerZ) is received before instruction 906 (from containerX to containerY) even though the physical movements happen in a different order. This can be cause, in some cases, by a distributed system in which the distributed computing elements are able to operate asynchronously.

When an instruction is logically permissible, such as instruction 902 to begin with, that instruction can be recorded in the ledger 806. When, after, or responsive to the ledger 806 updating, the cache 808 can be updated with the current state of the item. For example, once all three instructions 902-906 are recorded in the ledger in a logically-correct order, the cache 808 can traverse the instructions to determine the final state of the item at issue. Then, when other systems request the location of the item, the cache 808 can directly provide the state (including location) instead of requiring a complete traversal of the ledger each time.

In situations in which an instruction is received that is not logically possible, the instruction can be sent to the retry queue 816. Instructions in the retry queue 816 can optionally be held for a period of time and then re-evaluated to determine if they can be added to the ledger 806. In such a way, other instructions may be added to the ledger 806 that cause the instruction in the retry queue 816 to become a valid instruction. In the example shown here, the instructions would be added to the ledger in the order 902, 906, and then 904.

Alternatively, in some implementations, all of the instructions are added to the ledger 806 regardless of whether or not they are valid at the time they are added. In instances where an invalid instruction is added to the ledger 806, such as the invalid instructions 904, those instructions 904 can still be added to the ledger 806 but ignored for updating the cache 808 at the time they are received because they are invalid at the time of receipt. Such invalid instructions 904 can be added to the retry queue 816 and evaluated at one or more subsequent times for updating the cache 808, after which they can be added to the error log 928.

Figure 10:
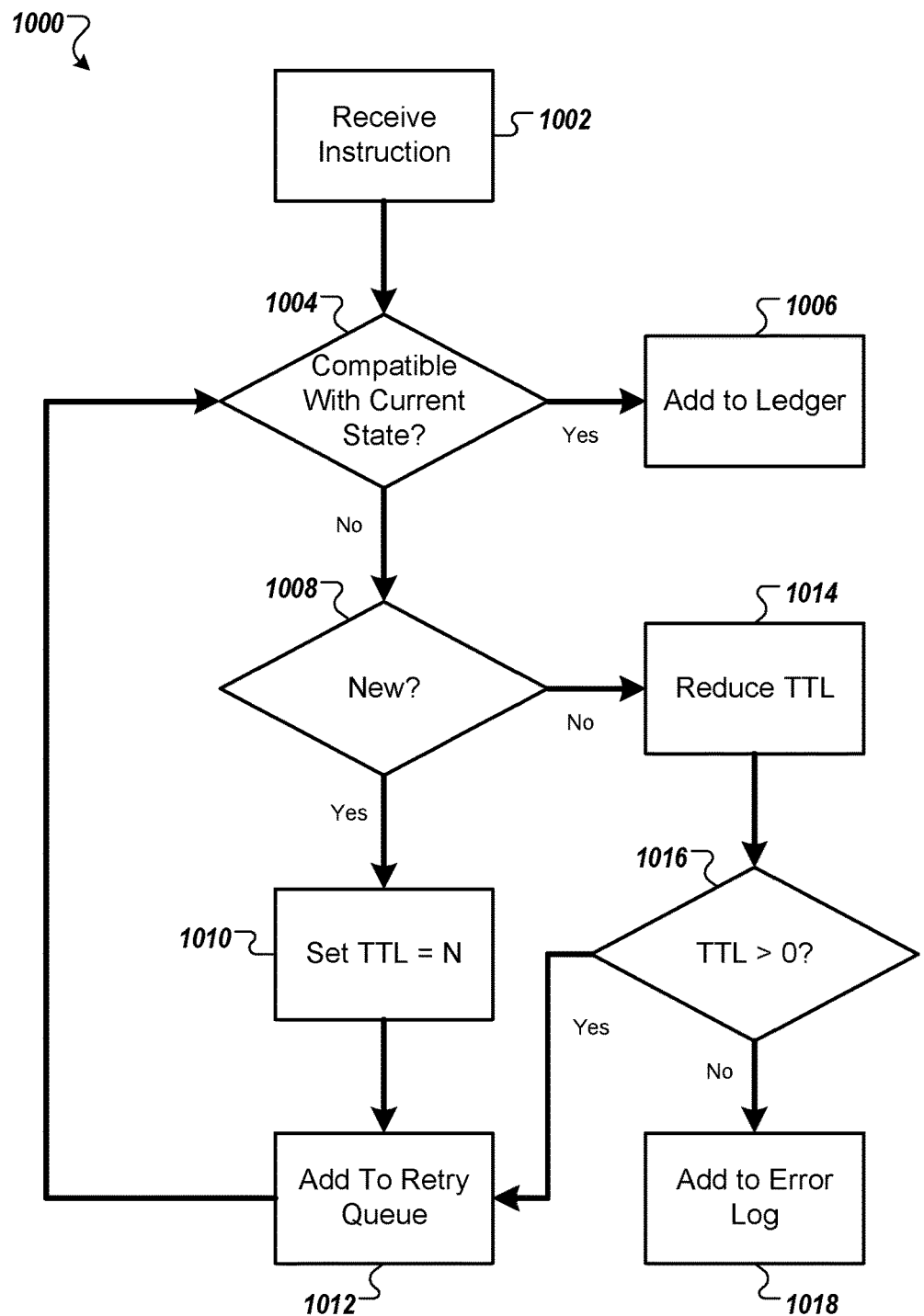
FIG. 10 is a flowchart of an example process for managing inventory data.

FIG. 10 is a flowchart of an example process 1000 for managing inventory data. The process 1000 or a similar process can be used, for example, by the system 800 or other systems. Therefore, the following example will be described with reference to the system 800, though other examples are possible.

An instruction is received 1002. For example, the warehouse associated with the system 800 may receive an order from a customer to purchase a socket wrench that is out-of-stock at the customer's local store but available at a distribution center in the city. The order manager 404 can generate an inventory instruction 802 to move the socket wrench to from its current location on a shelf in the distribution center into a bin, and then another instruction 802 to move the bin to a truck already instructed to drive to the store.

If the instructions are compatible with the current state 1004, the instruction is added to the ledger 1006. For example, the warehouse data system 208 can compare the two instructions 802 to the cache 808 that describes the state of the socket wrench and the bin. If the socket wrench is on the shelf identified in the instruction 802, that instruction 802 can be added to the ledger 806 for the socket wrench.

If the instruction is not compatible with the current state 1004, and if the instruction is new 1008, a Time To Live (TTL) of N is assigned to the instruction 1010. For example, if the socket wrench is not identified by the cache 808 as being in the location expected, the instruction can be assigned an initial TTL value of N. This TTL value describes the number of passes through the retry queue 816 an instruction should pass before being added to the error log 818.

The instruction is added to a retry queue 1012. The instruction, along with any other instruction added to the retry queue 816. In the error queue, the instruction is held for a period of time (fixed or variable, based on a clock reading or based on load, etc.) and then resubmitted to the process at 1004

If the instruction is not compatible with the current state 1004, and if the instruction is not new 1008, the instructions TTL is reduced 1014. For example, if the instruction has already been through the error queue one or more times, the TTL is reduced to reflect the most recent pass.

If the TTL is greater than zero 1016, the instruction is added to the retry queue 1012. As will be understood, this can be repeated until either the instruction becomes compatible 1004 and is added to the ledger 1006, or until the TTL reaches zero. If the TTL is not greater than zero 1016, the instruction is added to the error log 1018.

What is claimed is:

1. A method for operating components of a warehouse management system, the method comprising:
    maintaining, as part of a warehouse management system for an enterprise system in which physical items are stored in physical containers and in which the physical containers are each stored in one or more other physical containers, a data system having data records identifying logical items and logical containers that correspond to the physical items and physical containers, the data system storing the data records in a data-tree structure electronically reflecting the physical storage of the physical items in the physical containers with the other physical containers, wherein each record corresponds to a logical item or a single logical container, wherein the data-tree structure is provided by (i) the data records acting as nodes in the data-tree and (ii) references in the data records acting as edges in the data-tree, wherein the reference for each node is configured to store an identifier of another node that logically contains the node and that represents a physical container corresponding to the other node physically containing a physical item or other container corresponding to the node, wherein the data-tree structure provided by the data records and their references collectively provides physical locations of the physical containers and the physical items by representing physical-space relationships between the physical containers and the physical items and without the data records including physical location information;
    receiving, with a data network from an inventory manager configured to receive signals indicative of physical sensing of inventory, an indication that a particular physical item has been physically moved from a first physical container to a second physical container;
    responsive to receiving the indication that a particular physical item has been physically moved, identifying (i) a first data record that corresponds to the particular physical item, (ii) a second data record that corresponds to the second physical container, wherein the first data record includes a first reference that presently references a first identifier for a data record for the first physical container;
    updating, responsive to identifying the first data record and the second data record, the first data record by replacing the first identifier in the first reference with a second identifier for the second data record, wherein the replacing has the effect in the data-tree structure of (i) removing a first edge between a first node corresponding to the first record and another node corresponding to the data record for the first physical container and (ii) adding a second edge between the first node and a second node corresponding to the second record so that the first node is a child of the second node within the data-tree structure, wherein the second edge represents the storage of the particular physical item in the second physical container; and
    receiving a request for a logical location for a particular item;
    traversing the data-tree to identify a sequence of nodes that specify one or more containers that contain the particular item;
    generating, using the sequence of nodes, an ordered sequence of logical containers, the order sequence uniquely and fully identifies the logical location of the particular item; and
    returning the ordered sequence of logical containers as the logical location of the particular item.

2. The method of claim 1, wherein the data fields contain references to data fields of contained logical containers.

3. The method of claim 1, wherein the data fields contain references to data fields of contained logical containers and contained logical items.

4. The method of claim 3, wherein at least one data field contains a plurality of references.

5. The method of claim 1, wherein the updating comprises editing references of the data records without moving the data records to a different memory location.

6. The method of claim 5, wherein editing references comprises removing a particular string of characters from one data field and adding the particular string to another data field as an atomic action.

7. The method of claim 5, wherein editing references comprises:
    removing a particular string of characters from one data field; and responsive to removing the particular string of characters from the one data field, adding the particular string to another data field.

8. The method of claim 1, wherein the data records identifying logical items and logical containers that correspond to the physical items and physical containers comprise a ledger of historic instructions performed on the physical items and the physical containers.

9. The method of claim 1, wherein:
traversing the data-tree comprises traversing the data-tree from a root node to a leaf node corresponding to the particular item via a plurality of intermediate nodes that connect the root node to the leaf node in the data-tree,
the plurality of intermediate nodes correspond to a plurality of nested containers that contain the particular item, and
the sequence of nodes comprises a sequence of the plurality of intermediate nodes for the particular item.

10. A system comprising:
a processor;
computer memory containing instructions that, when executed with the processor, cause the system to perform operations comprising:
maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers, wherein each record corresponds to a logical item or a single logical container, and wherein data fields in the records are a data-tree of nodes and edges stored on disk, the data-tree matching physical-space relationships between the physical containers and the physical items defined by containing relationships that have a tree structure;
receiving an indication that a particular physical item has been moved from a first physical container to a second physical container;
responsive to receiving the indication that a particular physical item has been moved, identifying at least one identified data record that reflects the storage of the physical item in the first physical container;
updating, responsive to identifying at least one data records, the identified data records by removing a first edge from the data-tree and adding a second edge to the data-tree to change a particular node from being a child of a first parent-node to the child of a second parent node to reflect the storage of the physical item in the second physical container;
receiving a request for a logical location for a particular item;
traversing the data-tree to identify a sequence of nodes that specify one or more containers that contain the particular item;
generating, using the sequence of nodes, an ordered sequence of logical containers, the order sequence uniquely and fully identifies the logical location of the particular item; and
returning the ordered sequence of logical containers as the logical location of the particular item.

11. The system of claim 10, wherein the data fields contain references to data fields of contained logical containers.

12. The system of claim 10, wherein the data fields contain references to data fields of contained logical containers and contained logical items.

13. The system of claim 10, wherein the updating comprises editing references of the data records without moving the data records to a different memory location, and editing references comprises removing a particular string of characters from one data field and adding the particular string to another data field as an atomic action.

14. The system of claim 10, wherein the updating comprises editing references of the data records without moving the data records to a different memory location, and editing references comprises:
removing a particular string of characters from one data field; and
responsive to removing the particular string of characters from the one data field, adding the particular string to another data field.

15. The system of claim 10, wherein:
traversing the data-tree comprises traversing the data-tree from a root node to a leaf node corresponding to the particular item via a plurality of intermediate nodes that connect the root node to the leaf node in the data-tree,
the plurality of intermediate nodes correspond to a plurality of nested containers that contain the particular item, and
the sequence of nodes comprises a sequence of the plurality of intermediate nodes for the particular item.

16. A non-transitory computer-readable medium containing instructions that, when executed with a processor, cause the performance of operations comprising:
maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers, wherein each record corresponds to a logical item or a single logical container, and wherein data fields in the records are a data-tree of nodes and edges stored on disk, the data-tree matching physical space relationships between the physical containers and the physical items defined by containing relationships that have a tree structure;
receiving an indication that a particular physical item has been moved from a first physical container to a second physical container;
responsive to receiving the indication that a particular physical item has been moved, identifying at least one identified data record that reflects the storage of the physical item in the first physical container;
updating, responsive to identifying at least one data records, the identified data records by removing a first edge from the data-tree and adding a second edge to the data-tree to change a particular node from being a child of a first parent-node to the child of a second-parent node to reflect the storage of the physical item in the second physical container;
receiving a request for a logical location for a particular item;
traversing the data-tree to identify a sequence of nodes that specify one or more containers that contain the particular item;

generating, using the sequence of nodes, an ordered sequence of logical containers, the order sequence uniquely and fully identifies the logical location of the particular item; and returning the ordered sequence of logical containers as the logical location of the particular item.

17. The medium of claim 16, wherein the data fields contain references to data fields of contained logical containers and contained logical items.

18. The medium of claim 16, wherein:

traversing the data-tree comprises traversing the data-tree from a root node to a leaf node corresponding to the particular item via a plurality of intermediate nodes that connect the root node to the leaf node in the data-tree, the plurality of intermediate nodes correspond to a plurality of nested containers that contain the particular item, and the sequence of nodes comprises a sequence of the plurality of intermediate nodes for the particular item.

* * * * *